US008631239B2

(12) United States Patent
Djabarov et al.

(10) Patent No.: US 8,631,239 B2
(45) Date of Patent: Jan. 14, 2014

(54) MULTIPLE SYSTEM IMAGES FOR OVER-THE-AIR UPDATES

(75) Inventors: Gueorgui Djabarov, Sunnyvale, CA (US); George Hotz, Glen Rock, NJ (US); Shaheen Ashok Gandhi, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/349,137

(22) Filed: Jan. 12, 2012

(65) Prior Publication Data

US 2013/0185563 A1    Jul. 18, 2013

(51) Int. Cl.
*H04L 9/00*    (2006.01)
(52) U.S. Cl.
USPC ............................. 713/168; 713/176; 713/181
(58) Field of Classification Search
USPC ................. 713/168–170, 176, 181, 189, 191; 726/2–7, 26–30; 380/270; 717/168–178

See application file for complete search history.

(56) References Cited

U.S. PATENT DOCUMENTS

| 6,378,069 B1 * | 4/2002 | Sandler et al. ................. 713/153 |
| 7,480,907 B1 * | 1/2009 | Marolia et al. ................. 717/174 |
| 2007/0243900 A1 * | 10/2007 | Edwards et al. ........... 455/554.1 |

OTHER PUBLICATIONS

U.S. Appl. No. 13/349,419, filed Jan. 12, 2012, Djabarov.

* cited by examiner

*Primary Examiner* — Hosuk Song
(74) *Attorney, Agent, or Firm* — Baker Botts L.L.P.

(57) ABSTRACT

In one embodiment, a mobile device performs an over-the-air firmware update by writing the updated firmware to a inactive system image partition, and rebooting the device. The security of the OTA update is maintained through checking a plurality of security signatures in an OTA manifest, and the integrity of the data is maintained by checking a hash value of the downloaded system image.

18 Claims, 7 Drawing Sheets

MULTIPLE SYSTEM IMAGES FOR OVER-THE-AIR UPDATES

TECHNICAL FIELD

The present disclosure relates generally to over-the-air software updates.

BACKGROUND

Mobile devices possessing wireless data connectivity to public IP networks, otherwise known as the Internet, have become prevalent in recent times. Mobile devices include system software, or firmware that may need updating or reprogramming to remedy security exploits, bugs, and to support new features. Mobile devices commonly support OTA (over the air) programming, or FOTA (firmware over the air). It is used for upgrades to mobile phones and PDAs. The feature goes by several names including "software update", "firmware update" or "device management." Originally, firmware updates required visiting a specific service center, every mobile brand having their own. Another method has been upgrading by connecting the mobile device via a cable to a PC (personal computer). Both these methods are considered inconvenient by consumers and also depend heavily on consumers to seek out the upgrade, and therefore the majority of mobile phone manufacturers and operators have now adopted FOTA technology for their handsets. If the mobile device has FOTA capability, the user can instead download the firmware upgrade over the air directly from his or her mobile device. FOTA also allows manufacturers and operators to "push out" firmware upgrades to ensure that mobile consumers have the latest software improvements, which helps reduce customer support costs and increase consumer satisfaction.

DETAILED DESCRIPTION

Particular embodiments are now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1A:
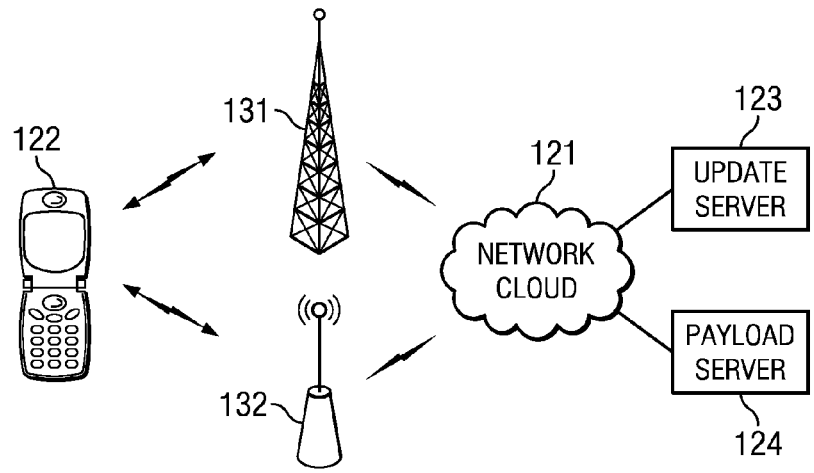
FIG. 1A illustrates an example network environment facilitating a FOTA operation.

FIG. 1A illustrates an example network environment in which data may be transmitted from a server to a mobile device. In particular embodiments, update server 120 may communicate with mobile device 122 and transmit data to mobile device 122 through network cloud 121. Update server 120 may comprise one or more computers or computing devices. In particular embodiments, update server 120 may be operably connected to payload server 124. Update server 120 and payload server 124 may be operable to deliver, alone or in conjunction, an OTA update of any suitable software application to mobile device 122.

Network cloud 121 generally represents a network or collection of networks (such as the Internet, a corporate intranet, a virtual private network, a local area network, a wireless local area network, a cellular network, a wide area network, a metropolitan area network, or a combination of two or more such networks) over which update server 120 may communicate with mobile device 122.

Mobile device 122 is generally a portable computer or computing device including functionality for communicating (e.g., remotely) over a network. For example, mobile device 122 can be a mobile phone, a tablet computer, a laptop computer, a handheld game console, an electronic book reader, or any other suitable portable devices. Mobile device 122 may execute one or more client applications, such as a web browser (e.g., Microsoft Windows Internet Explorer, Mozilla Firefox, Apple Safari, Google Chrome, and Opera, etc.) or special-purpose client application (e.g., Microsoft Outlook, Facebook for iPhone, etc.), to access and view content and messages transmitted from update server 120 over network cloud 121. In particular embodiments, mobile device 122 may connect to network cloud 121 via a base station 131 of a cellular network (e.g., a Global System for Mobile Communications or GSM cellular network, a Long Term Evolution or LTE network). In particular embodiments, mobile device 122 may connect to network cloud 121 via a wireless access point 132 of a WI-FI network.

In particular embodiments, mobile device 122 may connect to a social networking system through network cloud 121. A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system.

Figure 1B:
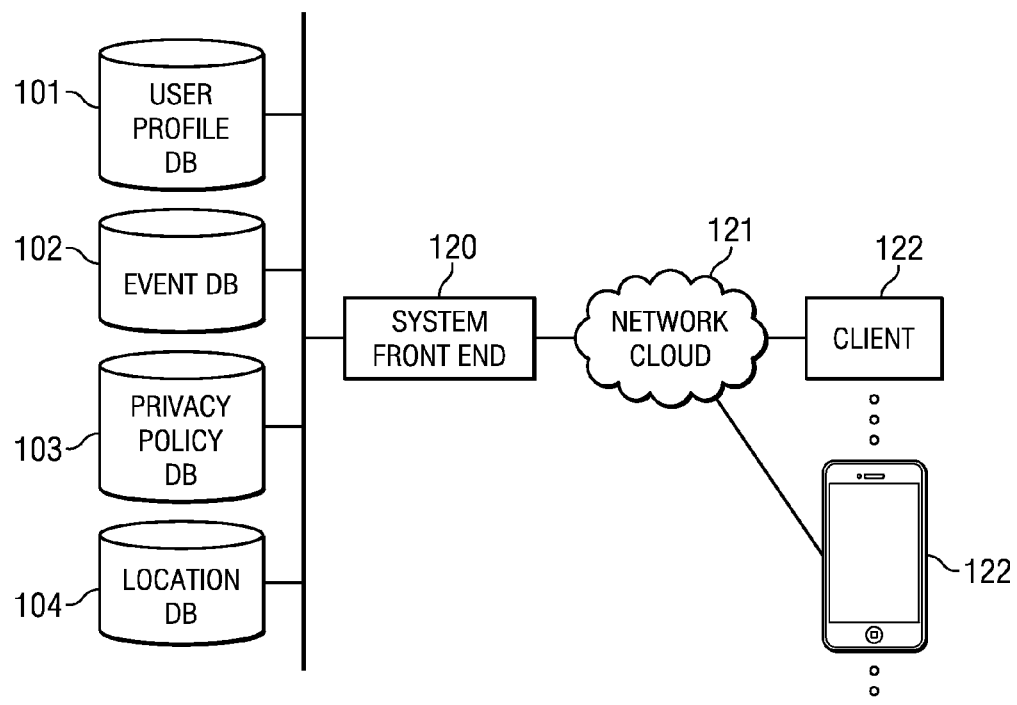
FIG. 1B illustrates an example network environment of a social networking system.

FIG. 1B illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in.

While mobile device 122 may access the social networking system through a mobile web browser resident on mobile device 122, in particular embodiments, mobile device 122 may run a special piece of application software installed in the memory of mobile device 122 to connect to the social networking system. In particular embodiments, the specialized social networking application may maintain a persistent TCP/IP connection with the social networking system in order to send and receive updates from mobile device 122 to the social networking system. In particular embodiments, the firmware of mobile device 122 itself may be provided by the social networking system. While this disclosure describes updating system firmware provided by a social networking system, this disclosure is applicable to any type of firmware or software OTA update.

Security is of eminent concern in firmware, and to a lesser extent, software application updates. Generally, firmware or software application publishers push new versions of their software/firmware to users in response to correcting a bug or fixing a software exploit that allows users or third-parties to compromise the device or the system. For example, the firmware/software publisher may update their software to eliminate a particular software exploit or attack, such as an eavesdropping or man-in-the-middle exploit. However, generally when a new update is announced, the exploit becomes public. Thus, there is a risk that malicious users may harvest software updates, downgrade their particular mobile device, and compromise the overall system.

Figure 2A:
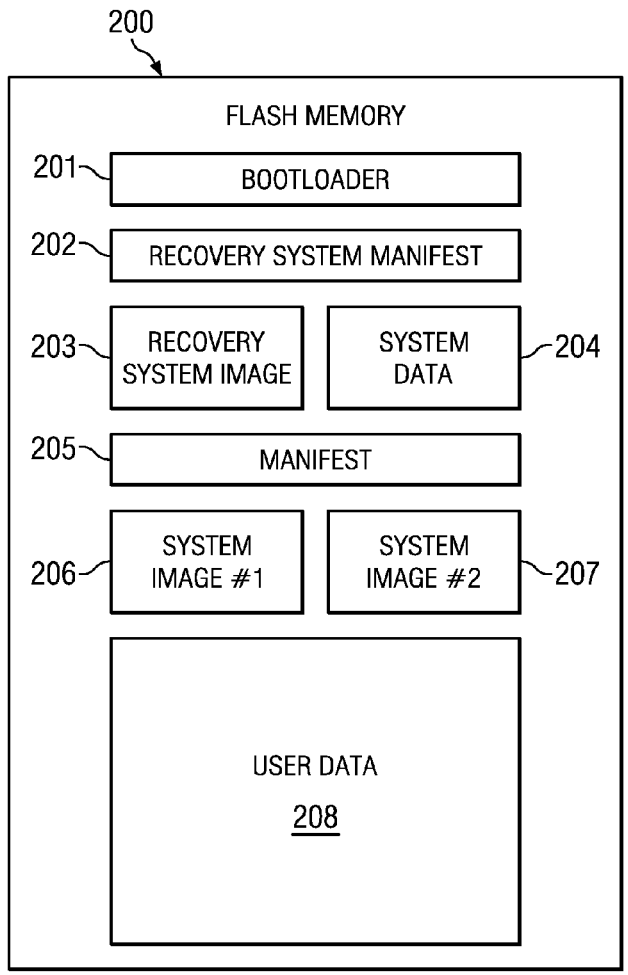
FIG. 2A illustrates an example partitioning of memory to support a background OTA firmware update.

FIG. 2A illustrates an example storage area 200 of mobile device 122. In particular embodiments, storage area 200 is solid-state flash memory, but this disclosure contemplates any suitable storage media. Flash memory 200 is partitioned into a plurality of discrete blocks. Bootloader partition 201 stores a dedicated application program executed by the system chip of mobile device 122 to begin the booting sequence to load the system image into RAM. In particular embodiments, the bootloader application may be digitally signed by a private key for security purposes. In particular embodiments, bootloader partition 201 may include multiple replicas of the bootloader application for flash safety; if one page of memory in which the bootloader application sits is corrupted, mobile device 122 may load one of the copies of the bootloader application.

As will be discussed further, booting to a particular system image requires a signed an authenticated manifest. Flash memory 200 includes a recovery manifest partition 202 that is necessary for booting to recovery system image partition 203. In particular embodiments, recovery manifest partition 202 is digitally signed with both a universal manifest key and a device specific manifest key for authentication and security purposes. In particular embodiments, recovery manifest 202 includes device 122's unique serial number. In particular embodiments, the serial number in manifest stored in manifest partition 202 is signed by a serial number key. The various keys permit the bootloader to verify that the recovery manifest stored in manifest partition 202 comes from a trusted source, and is not third-party code for purposes of exploiting security flaws. For instance, absent any security updates, a user may overwrite recovery system image in recovery system image partition 203 with a custom ROM, and corrupt the other system images or manifests, forcing mobile device 122 to boot to a third-party ROM.

Recovery system image partition 203 stores the system image, or firmware, that shipped from the factory floor with mobile device 122. In particular embodiments, recovery system image partition 203 is used when the device's other system image partitions 206 and 207 have been corrupted, so that mobile device 122 may revert back to factory settings if the device has been bricked.

Manifest partition 205 stores a manifest that is critical for booting to a system image written in system image partition #1 (206) or system image partition #2 (207). Because data corruption of the manifest may result in being unable to boot to either system image, in particular embodiments, flash memory 200 may include multiple copies of the manifest in manifest partition 205. In particular embodiments, the manifest is signed with a universal manifest private key and per device manifest private key.

Flash memory includes system image partitions 1 and 2 (206 and 207) for storing system firmware. At any given moment, only one system image is running (the "active image"), and the other image is free for updating (the "inactive image"). Thus, mobile device may run active image 1 while updating inactive image 2 and reboot to image 2, therefore making image 2 the active image. In such a manner, mobile device 122 "ping-pongs" between the two system images. The overall update process is described in further detail with respect to FIG. 2A.

Flash memory 200 also includes writable user data partition 208 for storing applications, media, and other user data, and unwritable system data partition 204 for maintaining operating system settings and other necessary files.

Figure 2B:
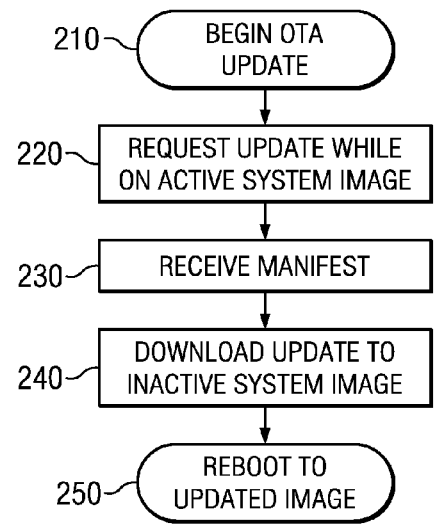
FIG. 2B illustrates an example method of performing an OTA firmware update.

FIG. 2B illustrates an example high-level method for performing an OTA firmware update using the memory configuration of FIG. 2A. At Step 210, mobile device 122 begins the OTA update process. Subsequently, at Step 220, mobile device 122, while still running on the active system image, for example, system image #1 (206), requests an update from a third-party. At Step 230, mobile device 122 receives an OTA manifest for the update, and writes it to manifest partition 205. At Step 240, mobile device 122 downloads the updated firmware and writes it to the inactive system image; in this example, system image #2 (207). Finally, to complete the update process, mobile device 122 reboots to the updated image (system image #2) at Step 250. The downloading of the manifest, downloading of the payload, and booting of the system are described in further detail with regard to FIGS. 3, 4, and 5/6, respectively.

Figure 3:
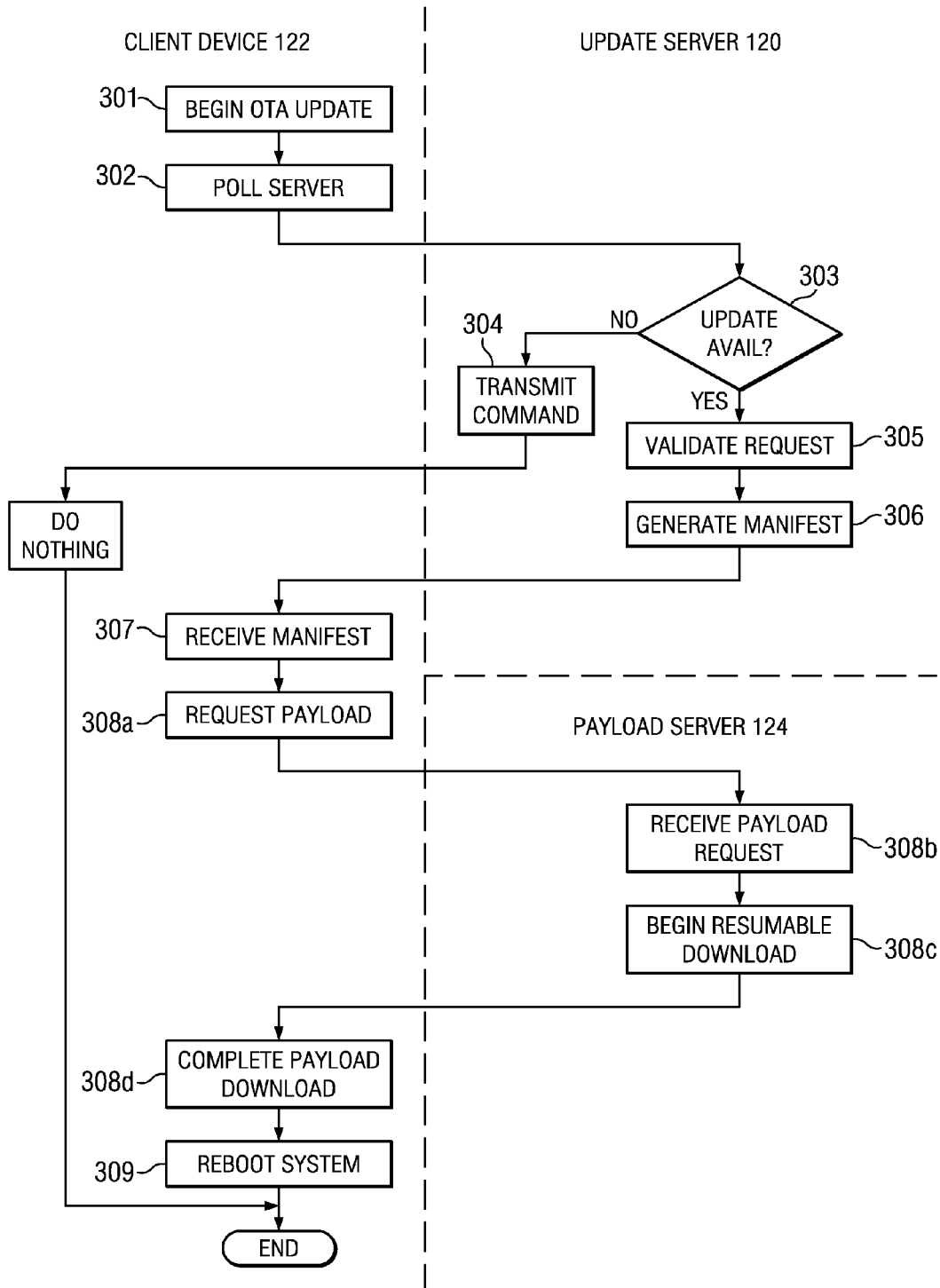
FIG. 3 an example method of receiving a manifest for performing a FOTA operation.

FIG. 3 illustrates an example method of updating system firmware resident on client device 122 via an update server 120 and payload server 124. As previously discussed, update server 120 may be a separate server from payload server 124. In particular embodiments, update server 120 and payload server 124 may be the same server or servers. This disclosure contemplates any suitable hardware configuration for update server 120 and payload server 124.

At Step 301, the OTA update process begins. In particular embodiments, the OTA update process may be triggered based on the expiration of a periodic timer, such as once a day. In particular embodiments, the social networking system, software provider, or carrier may trigger the OTA update process by transmitting an out-of-band message instructing mobile device 122 to begin the OTA process. In particular embodiments, the out of band message may be via the short-message service (SMS) in the form of a text or MMS message. In particular embodiments, the out of band message may be via the SMS in the form of a notification. In particular embodiments, the out of band message may be a wireless access protocol (WAP) push over the carrier SMS channel. In particular embodiments, the out of band message may be a data message through the packet switched core network of the carrier of mobile device 122. In particular embodiments, the out of band message may be a notification pushed from the social networking system via a persistent TCP/IP connection with mobile device 122. In particular embodiments, the persistent TCP/IP connection is a VPN tunnel. In particular embodiments, the OTA update process is triggered by user action, such as selecting an "update device" option from the user interface of mobile device 122. This disclosure contemplates any suitable means of triggering the OTA update process.

At Step 302, mobile device 122 polls update server 120 to check if a new firmware update is available by sending a request to the URL or IP address of update server 120. In particular embodiments, the request may be in the form of an HTTP POST request. In particular embodiments, the request may be an HTTPS POST. In particular embodiments, the request may include the time of the request for security purposes, such as to prevent a malicious user from requesting older versions of the firmware. In particular embodiments, the request may include an identifier for the particular hardware platform of mobile device 122. In particular embodiments, the request may include the current software (or "system") version running on mobile device 122, again to prevent a malicious user from hoarding or harvesting previous updates. In particular embodiments, the request may include the update time in order to protect against man-in-the-middle attacks; increased or abnormally long latency may indicate the presence of a malicious third-party.

In particular embodiments, update server 120 generates a unique firmware OTA manifest for each mobile device 122 based on its unique serial number. In order to verify the authenticity of the serial number of mobile device 122, mobile devices 122 making a request to update server 120 may, in particular embodiments, digitally sign the request via asymmetric key algorithms. In particular embodiments, when mobile device 122 is manufactured, the device manufacturer may burn a serial number private key into the ROM or fuses of mobile device 122, so that mobile device 122 may digitally sign transmissions to third-parties having the matching serial number public key. In particular embodiments, the serial number private key is unique to each device. In particular embodiments, the serial number key is universal to all devices, but mobile device 122 and update server 120 maintain public and private keys unique to each device. Thus, in such embodiments, a third-party may detect a device spoofing a particular serial number, because the device cannot sign requests with a correct serial number private key. In particular embodiments, the device serial number is burned into the fuses or ROM of mobile device 122, and as such, a user cannot alter the device's serial number.

For didactic purposes, an example request message is provided below:
POST https://device.facebook.com/update?
time=1309272392&
hardware-version=g1d030a7&
device-serial-number=355266040148288&
system-version=1.03 &
update-time=1307491710&
previous-system-version=1.01 &
update-check-trigger=device/facebook-push/user-ui/recovery-mode&
development=0&
hmac=facdd9a635a1e402a83810824d8c65e In the above example, the hmac (hash-based message authentication code) value is generated by a particular cryptographic hash function in conjunction with the serial number private key. In particular embodiments, the hash function is MD5 or SHA-1. Methods of verifying data integrity and authenticity are well-known in the art, and this disclosure contemplates any suitable method of verifying the authenticity of a request.

At Step 303, update server 120 receives the request from mobile device 122. In particular embodiments, update server 120 checks the system-version value transmitted in the request. If this value matches the most recent version available, at Step 304, update server 120 transmits a value in response to the HTTPS POST request, for example "302", that indicates that mobile device 122 has the most up-to-date software, and should do nothing. Mobile device 122, upon receiving the response, terminates the OTA process.

In particular embodiments, update server 120 may be busy due to network congestion, technical difficulties, or other unforeseen issues, and may issue a response to the HTTPS POST request, for example, "400", indicating that mobile device 122 should try again later. In such embodiments, mobile device 122 may wait a predetermined amount of time, for example one hour, and retransmit the HTTPS POST request to update server 120.

If, at Step 303, update server 120 determines that a new version for the firmware/software exists, update server 120 then validates the request at Step 304. In particular embodiments, update server 120 may additionally determine at Step 303 whether mobile device 122 is allowed to obtain the updated firmware. For example, the administrator of update server 120 may progressively roll out firmware or software in order to slowly address any complaints and prevent widespread damage, or "bricking" of all its customers. For example, update server 120 may roll out firmware updates based on IP address ranges or physical locations, hardware or system version, or based on the user's corporate affiliation (such as the administrator of update server 120's own employees). This disclosure contemplates any suitable method of selectively rolling out a software update, and any suitable method of determining whether a particular mobile device 122 is scheduled or authorized for a firmware update.

If update server 120 determines that a new update is available and, in particular embodiments, that requesting mobile device 122 is authorized to download the update, at Step 205, update server 120 validates the request. In particular embodiments, update server 120 includes a copy of the serial number private key of mobile device 122. In such embodiments, update server 120 may validate the request by checking the hmac value and device serial number. In particular embodiments, update server 10 may include mobile device 122's serial number public key in order to validate the request. As previously disclosed, in particular embodiments the serial number keys may be universal to all devices. In particular embodiments, the serial number keys are unique to each device/serial number. This disclosure contemplates any suitable implementation for securely validating a request.

At Step 306, update server 120 generates a unique OTA manifest for the update for mobile device 122. The OTA manifest is one of two keys to keeping the OTA update process secure; it also provides instructions to mobile device 122 for downloading the payload (the actual firmware update). For didactic purposes, an example manifest is displayed below:

```
manifest {
        systemVersion: "1.02",
        payloadURL:
        "http://device.update.com/99993e364706816aba3e25717850c26",
        payloadSHA1: "99993e364706816aba3e25717850c26",
        systemSHA1: "601f1889667efaebb33b8c12572835da",
        updaterSHA1: "2ab01a57287b40037b4cdb3bed18b8",
                downloadPolicy [
                        {bearer: "wifi", battery: "charging",
                        bandwidthLimit: 262144},
                        {bearer: "3g", time: {2200, 0600}, battery: 50},
                        {bearer: "3g", state: "idle", bandwidthLimit: 65536,
                        battery: 50},
                ],
        reboot {
                deadline: 1307088682,
                battery: 25,
        }
}
deviceSerialNumber: "355263040152098"
```

The example manifest above includes a system version and a URL from which mobile device 122 may download the payload (the firmware update). In particular embodiments, mobile device 122 downloads the payload via HTTP. In particular embodiments, mobile device 122 downloads the payload via FTP. This disclosure contemplates any suitable transfer protocol for downloading the payload, and any suitable URL defining a location from which the payload may be downloaded.

In particular embodiments, the OTA manifest includes a series of hmac values for verifying the data integrity or authenticating various portions of the update. In the example above, the manifest includes hash values for the payload, system, and updater. In particular embodiments, these hash values may be utilized by mobile device 122 to verify data integrity after the download of each portion of the payload, after a complete download of the payload, and after writing the payload to flash to ensure error-free writing. Although the example above describes hash values generated via the SHA1 cryptographic hash function, this disclosure contemplates any suitable cryptographic hash function, including without limitation: MD5, GOST, HAVAL, MD2, MD4, PANAMA, RadioGatun, RIPEMD, SHA-0, SHA-256/224, SHA-512/384, Tiger(2), WHIRLPOOL, and the like. This disclosure contemplates any suitable cryptographic hash function. In particular embodiments, the downloaded payload, system, and updater are unsigned by update server 120 or payload server 124 in order to reduce cryptographic calculation.

The manifest also includes a download policy, instructing mobile device 122 when and how to download the payload. In particular embodiments, the manifest may define the bearer over which mobile device 122 is to download the payload, for example WiFi, 3G, or 4G. In particular embodiments, the manifest may define the battery state required to download the payload, for example, charging, over 50%, etc. In particular embodiments, the manifest may control the dates and times at which mobile device 122 may download the update. In particular embodiments, the manifest may define the state in which mobile device 122 must be in order to download the update; for example, only when the device is not actively in use. In particular embodiments, the manifest may define a data or bandwidth limit for the download of the update; for example, only 1 MB a day or 256 k/hour etc. In the above example, the manifest defines three download policies: first, mobile device 122 is permitted to download the payload when it is on a WiFi bearer and plugged in, up to 262,144 bytes. In the second policy, mobile device 122 is permitted to download on a 3G bearer from the hours of 10 PM to 6 AM if the battery is above 50%. In the final policy, mobile device 122 is permitted to download over a 3G bearer when the device is idle and has over 50% battery, up to 65 k of data. This disclosure contemplates a manifest defining any suitable device or environmental condition for downloading the payload.

In particular embodiments, the manifest defines when the device reboots to the newly updated system image. Because rebooting modern mobile devices is a time-consuming process, it is preferable to reboot mobile device 122 when the user is not actively interacting with the device, or further, when the user is unlikely to interact with the device for a predetermined amount of time. Thus, in particular embodiments, the manifest may define that the mobile device only reboot itself during a particular time window, for example, from 3 AM-5 AM. In particular embodiments, the manifest may define a battery state in the reboot conditions. For example, the manifest may instruct mobile device 122 only to reboot if the battery level meets some minimum threshold. In particular embodiments, the reboot operation may be overridden by user action. For example, the device may provide the user with a prompt that states his or her device will reboot in 10 seconds absent user intervention. This disclosure contemplates any suitable device or environment condition requirement for rebooting mobile device 122.

In particular embodiments, the OTA manifest also includes the serial number for mobile device 122. Thus the portion under the "manifest { }" block is the universal manifest, because it is the same for all devices. As will be discussed in further detail with reference to paragraphs 5 and 6, the system bootloader will not load a system image unless the manifest passes a number of checks. In particular embodiments, one such check is to determine that the manifest serial number matches the serial number of the mobile device.

In particular embodiments, to enhance security, the manifest and appended serial number may each be signed by a different cryptographic security key. The universal manifest itself may be signed by a universal manifest private key stored at the firmware developer's secure location. Because, in such embodiments, mobile device 122 maintains a copy of the universal manifest public key, mobile device 122 may verify that the manifest comes from the developer itself, rather than a man-in-the middle. Additionally, the serial number appended to the manifest may be signed by a number of keys.

In particular embodiments, the serial number may be signed by a private per device manifest key stored at update server 120. Because mobile device 122 maintains a public per device manifest key, mobile device 122 may verify the identity of the firmware developer. In particular embodiments, the serial number appended to the universal manifest may also be signed with a serial number private key maintained at the update server 120. In particular embodiments, the serial number may be signed by both the private per device manifest and serial number keys. This disclosure contemplates any suitable method of authenticating the universal manifest and serial number.

At Step 307, mobile device 122 receives the manifest from update server 120 and authenticates the universal manifest and serial number as described above. In particular embodiments, it uses its UniveralManifestKey.public to authenticate the signature on the universal manifest, and PerDeviceManifestKey.public and SerialNumberKey.private to authenticate the signature on the serial number.

Having authenticated the manifest, mobile device 122 at Step 308a requests the payload from payload server 124 by making a request to the URL specified in the manifest. In particular embodiments, the request is an HTTP request. In particular embodiments, the request is an HTTP request with range support in order to support resumable or partial downloading of the payload. In particular embodiments, the request is a torrent tracker file for downloading from a plurality of download servers 124. This disclosure contemplates any suitable method of requesting and downloading the payload. Steps 308a-d pertain to the downloading of the payload; the download process is described in further detail with respect to FIG. 4. After successfully downloading the payload, at Step 309, mobile device 122 reboots the system in accordance with the reboot instructions included in the manifest.

Figure 4:
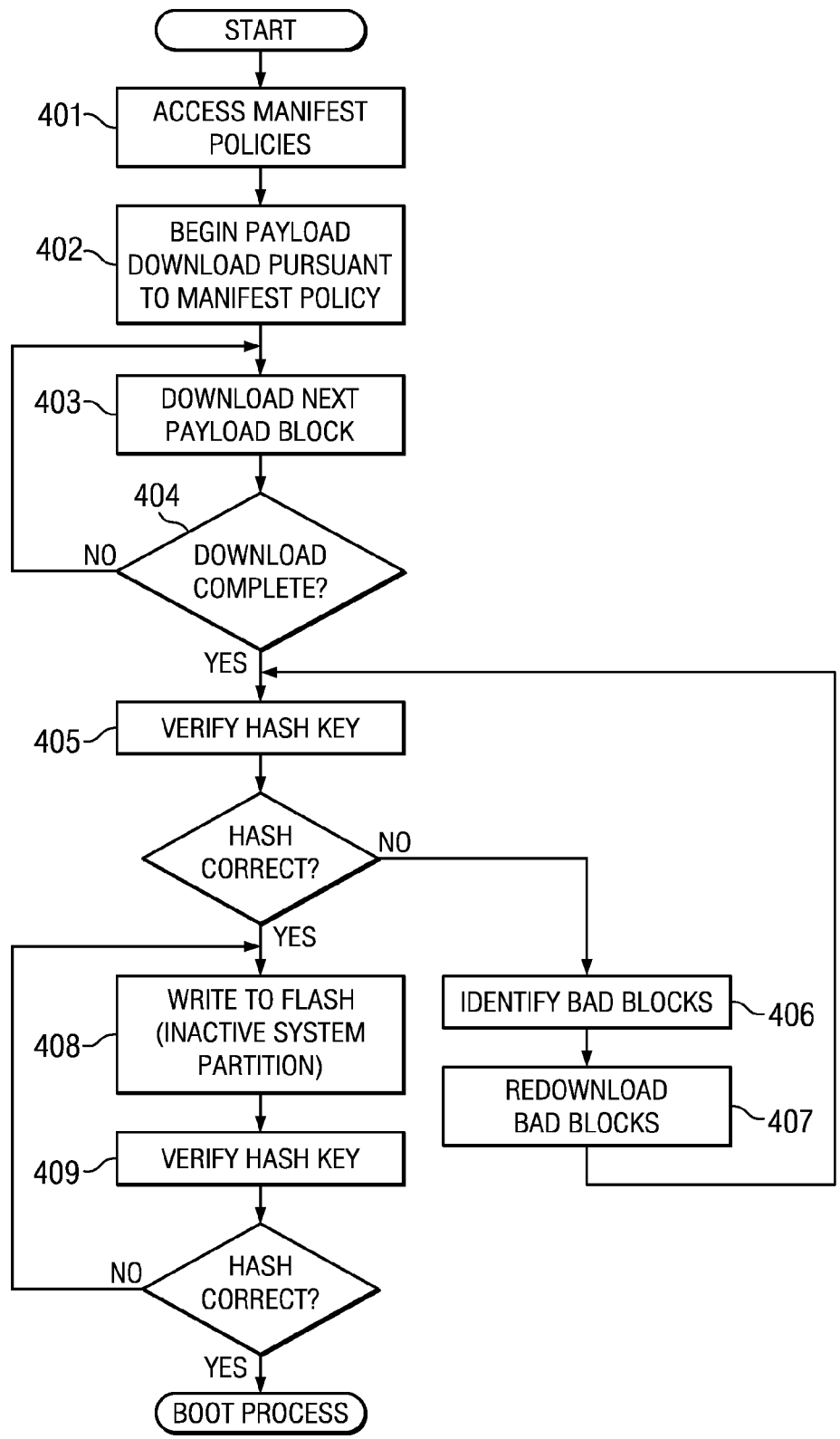
FIG. 4 illustrates an example method of performing a resumable download of firmware during an FOTA operation.

FIG. 4 illustrates the download process of 308a-d in greater detail. At Step 401, mobile device accesses the download policies included in the received manifest (for example, "DownloadPolicy[ ]"). At Step 402, mobile device 122 begins the download of the payload pursuant to the instructions in the download policy. In particular embodiments, the payload may be cached or hosted on a third-party server separate from the firmware developer's servers. In particular embodiments, the payload may be segmented into multiple blocks of a predetermined size, for example, 65 k. In particular embodiments, mobile device 122 downloads the payload to system data partition 204.

At Step 403, mobile device 122 begins download of the next block. Mobile device 122 downloads blocks so long as it meets the download policies in the manifest; if mobile device 122 meets its daily bandwidth or data limit, for example, it stops downloading until it is able to download more data pursuant to the download policy. At Step 404, mobile device 122 checks whether it has downloaded the complete payload to system data partition 204. If not, the process repeats Step 403.

After downloading the entire payload, at Step 405, the current running system in the user space checks the downloaded data against the hash value transmitted in the manifest. For example, mobile device 122 may run the SHA-1 algorithm on the downloaded data, and check it against the value of payloadSHA1 received in the universal manifest. If the values do not match, mobile device 122 knows that a download error has occurred, and at Step 406, it identifies which blocks were corrupted. In particular embodiments, each block includes its own hash value (SHA1 or otherwise). In such embodiments, at Step 406 mobile device 122 calculates hash values for each downloaded block and compares it to the hash value downloaded with each block. In particular embodiments, mobile device 122 performs a checksum immediately upon downloading a block, and redownloads any blocks whose calculated hash value does not match its downloaded hash value. This disclosure contemplates any suitable method of checking individual blocks and identifying bad blocks of the payload.

After identifying the bad blocks, mobile device 122 then requests from payload server 124 only the bad blocks for re-downloading at Step 407. The process then returns to the hack check of 405 to verify the data integrity of the entire downloaded payload. After verifying that the hash value of the complete payload matches the value of payloadSHA1, the process proceeds to Step 408. In particular embodiments, the system calls a more secure layer to perform the hash check of Step 407 immediately prior to writing the system image to flash memory 200.

At Step 408 mobile device 122 copies the downloaded system image from system data partition 204 to the inactive system image partition. Because a single bad page write onto flash memory 200 could cause a boot failure, mobile device 122 performs one more hash check at Step 409 to verify the data integrity of the system image written to the inactive system image partition. In particular embodiments, the payload may be in compressed format. In such embodiments, mobile device 122 may extract the downloaded system image to the inactive system partition. Finally, if the system image in the inactive system image partition passes the hash check, the system reboots pursuant to the reboot instructions of the universal manifest and completes installation of the updated firmware.

Figure 5:
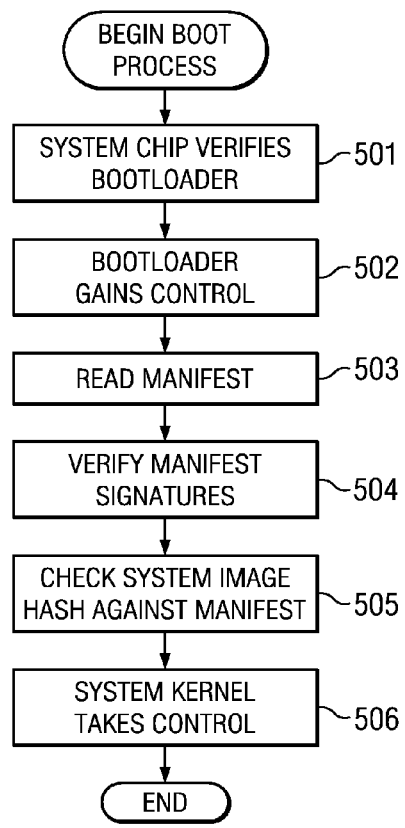
FIG. 5 illustrates an example method of booting a mobile device with newly-downloaded firmware.

FIG. 5 illustrates an example method of booting a mobile device to a newly updated system image. At Step 501, upon powering on the device, the boot ROM in the mobile chip validates the bootloader application signature via a public bootloader key. In particular embodiments, the boot ROM first reads the boot configuration table (BCT) from one of the bootloader flash replicas, which contain the bootloader hash and the flash block address. The boot ROM then decrypts, via the public bootloader key, the bootloader in memory, and verifies the bootloader hash from the BCT. In particular embodiments, the public bootloader key is burned into the fuses of mobile device 122 at the factory. Upon verifying the bootloader, the chip runs the bootloader application from bootloader partition 201.

At Step 502, the bootloader application gains execution control, and at Step 503, the bootloader reads the manifest from manifest partition 204. In particular embodiments, the bootloader may obtain the manifest from any of the flash replicas in manifest partition 204.

At Step 503, the bootloader checks the manifest signature with the public universal manifest key (UniversalManifestKey.public) and the public per device manifest key (PerDeviceManifestKey.public). In particular embodiments, the bootloader also verifies the serial number by using the serial number public key.

At Step 504, the bootloader verifies the hash value of the system image against the hash value transmitted in the manifest. In particular embodiments, the bootloader may perform multiple checksums for payloadSHA1, systemSHA1, or updaterSHA1. As previously described, any particular cryptographic hash function may be utilized.

After verifying that the hash value of the system image matches the manifest system image hash, at Step 506, the system kernel gains execution control, completing the update process.

Figure 6:
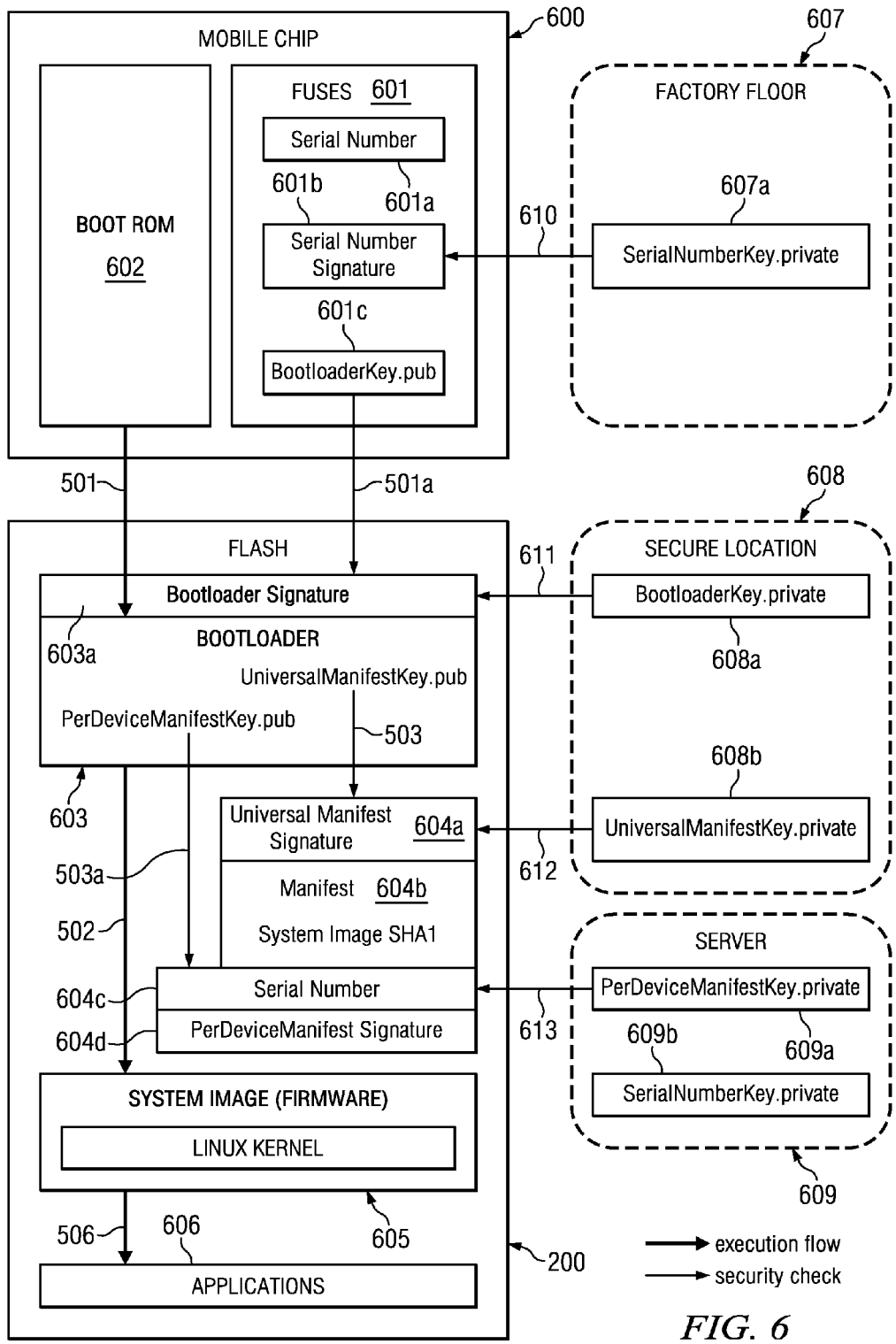
FIG. 6 illustrates the software execution and security checks involved in the boot process of FIG. 5.

FIG. 6 is an alternative representation of the boot process of FIG. 5. The thick dark arrows in FIG. 6 refer to the system execution flow, whereas the thin arrows refer to security checks.

Mobile device 122 leaves factory floor 607 with a number of pieces of data burned into the fuses 601 of its mobile chip 600: serial number 601a, serial number signature 601b, and bootloader public key 601c. These values cannot be changed by third-party code or any modifications, because they are physically hard-coded into the hardware of mobile chip 600. As previously discussed, serial number 601a is central to the security of the OTA update; it permits update server 120 to validate any request for a OTA software download. In particular embodiments, mobile device 122 may also include a serial number signature 602b in its requests for OTA updates. Because the number signature 602b is signed at factory floor 607 via SerialNumberKey.private (check 610), it is essentially impossible for a user to fake or spoof the serial number of mobile device 122. That is, even if the user were able to obtain a blank mobile chip 600 and reprogram another serial number into fuses 601, he or she would be unable to generate serial number signature 601b, because the user lacks SerialNumberKey.private. BootloaderKey.public is used by boot ROM 602 to validate bootloader signature 603a.

Bootloader signature 603a is generated at a secure location 608, typically at the location of the firmware developer, via BootloaderKey.private 608a (Step 611). Secure location 608 includes two private keys that are never distributed to the public: Bootloaderkey.private and UniversalManifestKey.private. After the firmware developer readies a firmware update to be pushed to all devices, it attaches a signature to manifest 604b. Universal manifest signature 604a is generated by digitally signing manifest 604b with UniversalMainfiestKey.private (check 612).

Serial number 604c is appended to the universal manifest by update server 120 during manifest generation. Serial number 604c also includes a PerDeviceManifest signature 604d. Both serial number 604c and PerDeviceManifest signature 604d are generated by update server 120 by digitally signing the serial number with SerialNumberKey.private 609b (check 613) and PerDeviceManifestKey.private 609a, respectively.

Bootloader 603 verifies universal manifest signature 604a via UniversalManifestKey.pub in Step 503, serial number 604c with SerialNumberKey.pub, and per device manifest signature 604d with PerDeviceManifestKey.pub (Step 503a). After the manifest has been verified, the system image is hashed via a predetermined hash function, and checked against the hash value in manifest 604b (System Image SHA1). As previously described above, the newly updated system image or firmware 605 then takes control of mobile device 122 (Step 506), and may load applications 606.

Figure 7:
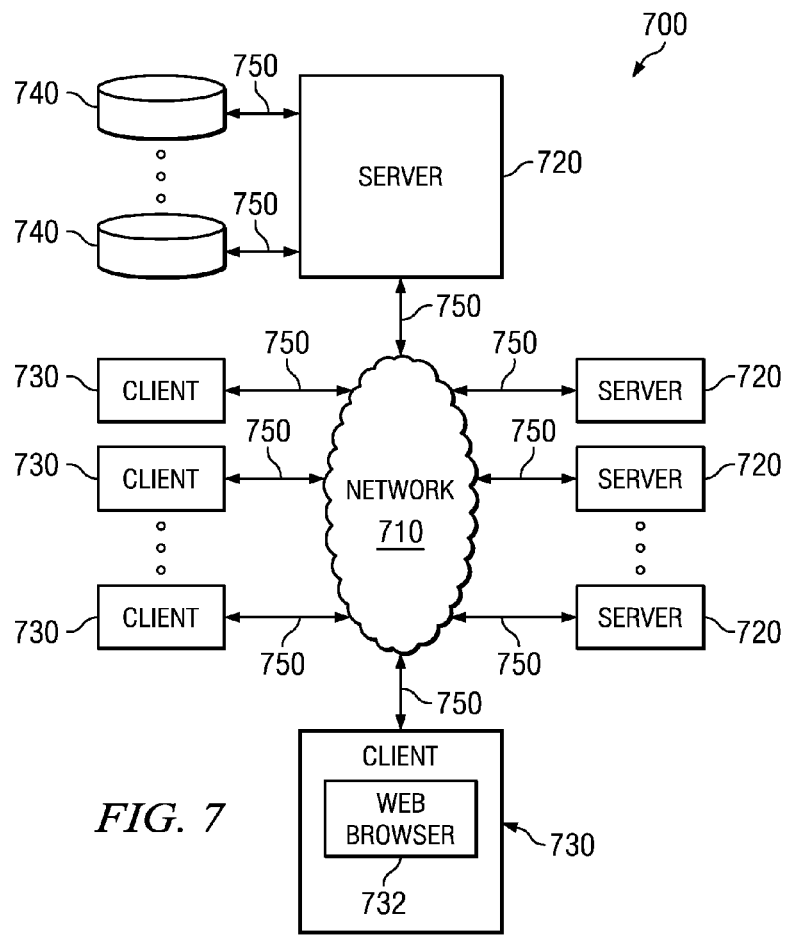
FIG. 7 illustrates an example network environment.

While the foregoing embodiments may be implemented in a variety of network configurations, the following illustrates an example network environment for didactic, and not limiting, purposes. FIG. 7 illustrates an example network environment 700. Network environment 700 includes a network 710 coupling one or more servers 720 and one or more clients 730 to each other. Network environment 700 also includes one or more data storage 740 linked to one or more servers 720. Particular embodiments may be implemented in network environment 700. For example, social networking system frontend 120 may be written in software programs hosted by one or more servers 720. For example, event database 102 may be stored in one or more data storage 740. In particular embodiments, network 710 is an intranet, an extranet, a virtual private network (VPN), a local area network (LAN), a wireless LAN (WLAN), a wide area network (WAN), a metropolitan area network (MAN), a portion of the Internet, or another network 710 or a combination of two or more such networks 710. The present disclosure contemplates any suitable network 710.

One or more links 750 couple a server 720 or a client 730 to network 710. In particular embodiments, one or more links 750 each includes one or more wired, wireless, or optical links 750. In particular embodiments, one or more links 750 each includes an intranet, an extranet, a VPN, a LAN, a WLAN, a WAN, a MAN, a portion of the Internet, or another link 750 or a combination of two or more such links 750. The present disclosure contemplates any suitable links 750 coupling servers 720 and clients 730 to network 710.

In particular embodiments, each server 720 may be a unitary server or may be a distributed server spanning multiple computers or multiple datacenters. Servers 720 may be of various types, such as, for example and without limitation, web server, news server, mail server, message server, advertising server, file server, application server, exchange server, database server, or proxy server. In particular embodiments, each server 720 may include hardware, software, or embedded logic components or a combination of two or more such components for carrying out the appropriate functionalities implemented or supported by server 720. For example, a web server is generally capable of hosting websites containing web pages or particular elements of web pages. More specifically, a web server may host HTML files or other file types, or may dynamically create or constitute files upon a request, and communicate them to clients 730 in response to HTTP or other requests from clients 730. A mail server is generally capable of providing electronic mail services to various clients 730. A database server is generally capable of providing an interface for managing data stored in one or more data stores.

In particular embodiments, one or more data storages 740 may be communicatively linked to one or more servers 720 via one or more links 750. In particular embodiments, data storages 740 may be used to store various types of information. In particular embodiments, the information stored in data storages 740 may be organized according to specific data structures. In particular embodiment, each data storage 740 may be a relational database. Particular embodiments may provide interfaces that enable servers 720 or clients 730 to manage, e.g., retrieve, modify, add, or delete, the information stored in data storage 740.

In particular embodiments, each client 730 may be an electronic device including hardware, software, or embedded logic components or a combination of two or more such components and capable of carrying out the appropriate functions implemented or supported by client 730. For example and without limitation, a client 730 may be a desktop computer system, a notebook computer system, a netbook computer system, a handheld electronic device, or a mobile telephone. The present disclosure contemplates any suitable clients 730. A client 730 may enable a network user at client 730 to access network 730. A client 730 may enable its user to communicate with other users at other clients 730.

A client 730 may have a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVA-SCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 8:
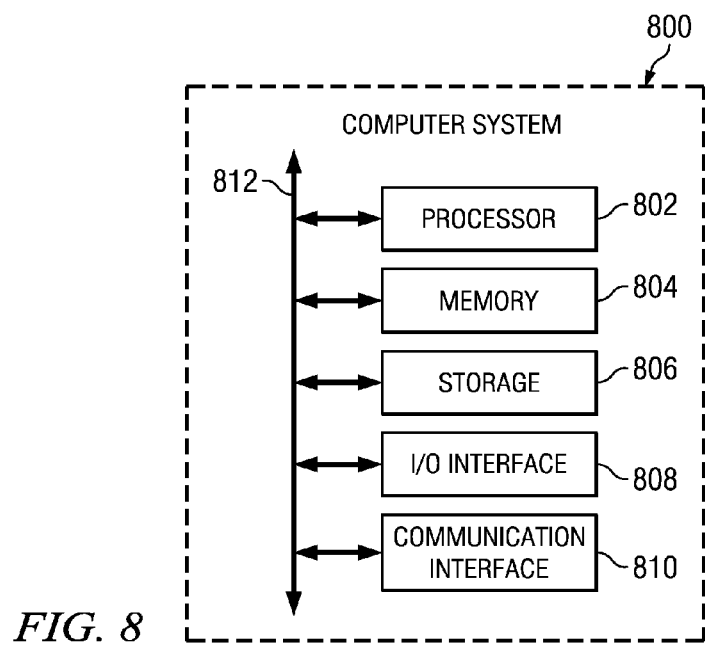
FIG. 8 illustrates an example computer system.

FIG. 8 illustrates an example computer system 800, which may be used with some embodiments of the present disclosure. This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. The present disclosure contemplates processor 802 including any suitable number of any suitable internal caches, where appropriate. As an example and not by way of limitation, processor 802 may include one or more instruction caches, one or more data caches, and one or more translation look-aside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. The present disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 804 may include one or more memories 802, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 808. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 812 may include one or more buses 812, where appropriate. Although this disclosure describes and illustrates a particular bus, this disclosure contemplates any suitable bus or interconnect.

Figure 9:
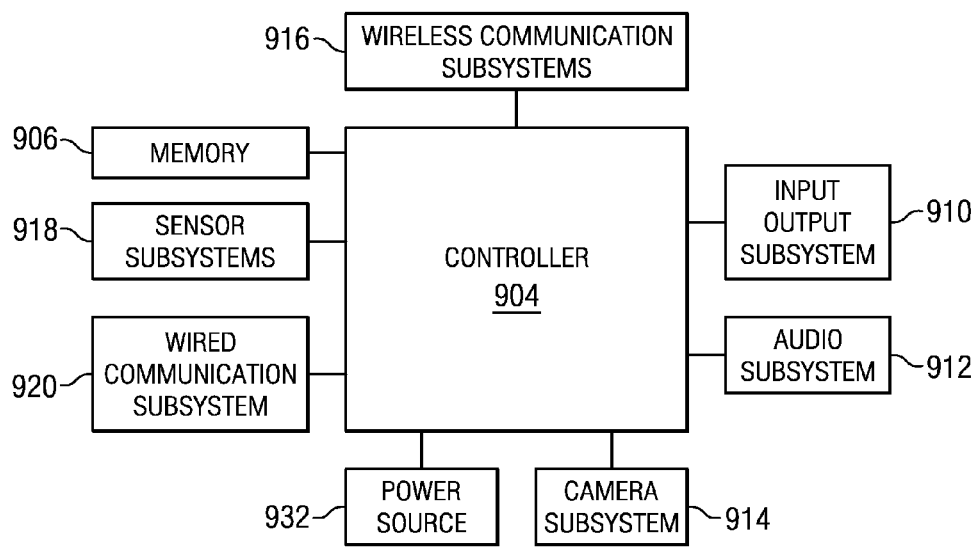
FIG. 9 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 9 shows a schematic representation of the main components of an example computing platform of a client or mobile device, according to various particular embodiments. In particular embodiments, computing platform 902 may comprise controller 904, memory 906, and input output subsystem 910. In particular embodiments, controller 904 which may comprise one or more processors and/or one or more microcontrollers configured to execute instructions and to carry out operations associated with a computing platform. In various embodiments, controller 904 may be implemented as a single-chip, multiple chips and/or other electrical components including one or more integrated circuits and printed circuit boards. Controller 904 may optionally contain a cache memory unit for temporary local storage of instructions, data, or computer addresses. By way of example, using instructions retrieved from memory, controller 904 may control the reception and manipulation of input and output data between components of computing platform 902. By way of example, controller 904 may include one or more processors or one or more controllers dedicated for certain processing tasks of computing platform 902, for example, for 2D/3D graphics processing, image processing, or video processing.

Controller 904 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 906 that is operatively coupled to controller 904.

Memory 906 may encompass one or more storage media and generally provide a place to store computer code (e.g., software and/or firmware) and data that are used by computing platform 902. By way of example, memory 906 may include various tangible computer-readable storage media including Read-Only Memory (ROM) and/or Random-Access Memory (RAM). As is well known in the art, ROM acts to transfer data and instructions uni-directionally to controller 904, and RAM is used typically to transfer data and instructions in a bi-directional manner. Memory 906 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 904. Information may also reside on one or more removable storage media loaded into or installed in computing platform 902 when needed. By way of example, any of a number of suitable memory cards (e.g., SD cards) may be loaded into computing platform 902 on a temporary or permanent basis.

Input output subsystem 910 may comprise one or more input and output devices operably connected to controller 904. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 902. The display is generally configured to display a graphical user interface (GUI) that provides an easy to use visual interface between a user of the computing platform 902 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 910 may also include touch based devices such as touch pad and touch screen. A touchpad is an input device including a surface that detects touch-based inputs of users. Similarly, a touch screen is a display that detects the presence and location of user touch inputs. Input output system 910 may also include dual touch or multi-touch displays or touch pads that can identify the presence, location and movement of more than one touch inputs, such as two or three finger touches.

In particular embodiments, computing platform 902 may additionally comprise audio subsystem 912, camera subsystem 912, wireless communication subsystem 916, sensor subsystems 918, and/or wired communication subsystem 920, operably connected to controller 904 to facilitate various functions of computing platform 902. For example, Audio subsystem 912, including a speaker, a microphone, and a codec module configured to process audio signals, can be utilized to facilitate voice-enabled functions, such as voice recognition, voice replication, digital recording, and telephony functions. For example, camera subsystem 912, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 920 can include a Universal Serial Bus (USB) port for file transferring, or a Ethernet port for connection to a local area network (LAN). Wireless communication subsystem 916 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 916 may include hosting protocols such that computing platform 902 may be configured as a base station for other wireless devices.

Sensor subsystem 918 may include one or more sensor devices to provide additional input and facilitate multiple functionalities of computing platform 902. For example, sensor subsystems 918 may include GPS sensor for location positioning, altimeter for altitude positioning, motion sensor for determining orientation of a mobile device, light sensor for photographing function with camera subsystem 914, temperature sensor for measuring ambient temperature, and/or biometric sensor for security application (e.g., fingerprint reader).

In particular embodiments, various components of computing platform 902 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

Additionally, computing platform 902 may be powered by power source 932.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing systems:
   executing software from a first partition of system memory;
   requesting an over-the-air (OTA) software update from an endpoint;
   receiving a manifest for the OTA update;
   downloading a payload pursuant to the manifest;
   installing the payload into a second partition of system memory; and
   rebooting, pursuant to the manifest, to the second partition of system memory, wherein rebooting to the second partition of system memory comprises authenticating a bootloader signature with a bootloader public key.

2. The method of claim 1 wherein the request comprises the serial number of the one or more computing systems.

3. The method of claim 1, wherein the manifest comprises a predetermined battery state in which the one or more computing systems must be in order to download the payload.

4. The method of claim 1, wherein the manifest comprises a predetermined time period during which the one or more computing systems may download the payload.

5. The method of claim 1, wherein the manifest comprises a predetermined battery state in which the one or more computing systems must be in order to reboot to the second partition of system memory.

6. The method of claim 1, wherein the manifest comprises a predetermined time period during which the one or more computing systems may reboot to the second partition of system memory.

7. The method of claim 1, wherein the manifest comprises a manifest signature and device unique signature, and rebooting to the second partition of system memory comprises:
   authenticating the manifest signature with a manifest signature public key;
   authenticating the device unique signature with a device unique public key; and
   failing to boot to the second partition of system memory if either authentication fails.

8. The method of claim 1 wherein the manifest comprises a first hash value for the payload, and rebooting to the second partition of system memory further comprises:
   calculating a second hash value for the downloaded payload based on a predetermined cryptographic hash algorithm;
   comparing the first hash value to the second hash value; and
   failing to boot to the second partition of system memory if the first and second hash values are not identical.

9. The method of claim 1, wherein the manifest comprises an encrypted serial number, and rebooting to the second partition of system memory comprises:
   decrypting the serial number with a serial number public key;
   comparing the decrypted serial number to a serial number of he one or more computing devices; and
   failing to hoot to the second partition of system memory if the serial number and the decrypted serial number are not identical.

10. A method, comprising, by one or more computing systems:
    receiving, from a client device, a request for an over-the-air (OTA) software update comprising a unique identifier for the client device and a digital signature;
    authenticating the digital signature with a serial number private key;
    in response to a positive authentication, generating an OTA manifest for the device comprising:
      one or more download instructions;
      one or more reboot instructions;
      one or more resource locations from which updated software may be downloaded;
      a hash value for the updated software;
    generating the OTA manifest for the device comprising:
      digitally signing the manifest with a private key common to all devices;
      appending the serial number of the client device; and
      digitally signing the serial number with a private key unique to the client device; and
    transmitting the manifest to the client device.

11. A non-transitory, computer-readable media comprising instructions operable, when executed by one or more computing systems, to:
    execute software from a first partition of system memory;
    request an over-the-air (OTA) software update from an endpoint;
    receive a manifest for the OTA update;
    download a payload pursuant to the manifest;
    install the payload into a second partition of system memory; and
    reboot the one or more computing systems, pursuant to the manifest, to the second partition of system memory, wherein rebooting to the second partition of system memory comprises authenticating a bootloader signature with a bootloader public key.

12. The media of claim 11 wherein the request comprises the serial number of the one or more computing systems.

13. The media of claim 11, wherein the manifest comprises a predetermined battery state in which the one or more computing systems must he in order to download the payload.

14. The media of claim 11, wherein the manifest comprises a predetermined time period during which the one or more computing systems may download the payload.

15. The media of claim 11, wherein the manifest comprises a predetermined battery state in which the one or more computing systems must be in order to reboot to the second partition of system memory.

16. The media of claim 11, wherein the manifest comprises a predetermined time period during which the one or more computing systems may reboot to the second partition of system memory.

17. The media of claim 11, wherein the manifest comprises a manifest signature and device unique signature, and rebooting to the second partition of system memory comprises:
   authenticating the manifest signature with a manifest signature public key;
   authenticating the device unique signature with a device unique public key; and
   failing to boot to the second partition of system memory if either authentication fails.

18. The media of claim 11, wherein the manifest comprises a first hash value for the payload, and rebooting to the second partition of system memory further comprises:
   calculating a second hash value for the downloaded payload based on a predetermined cryptographic hash algorithm;
   comparing the first hash value to the second hash value; and
   failing to boot to the second partition of system memory if the first and second hash values are not identical.

* * * * *